United States Patent
Nakamura et al.

(10) Patent No.: US 7,532,248 B2
(45) Date of Patent: May 12, 2009

(54) ADAPTER DEVICE AND VIDEO CAMERA DEVICE

(75) Inventors: Hitoshi Nakamura, Kanagawa (JP); Tomoyasu Katsuyama, Kanagawa (JP); Tooru Kirihara, Kanagawa (JP); Masao Hirose, Shizuoka (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 11/311,468

(22) Filed: Dec. 20, 2005

(65) Prior Publication Data

US 2006/0146179 A1    Jul. 6, 2006

(30) Foreign Application Priority Data

Jan. 6, 2005    (JP)    ............................. 2005-001868

(51) Int. Cl.
  *H04N 3/14*    (2006.01)
  *G03B 17/00*    (2006.01)

(52) U.S. Cl. ........................................ 348/375; 396/420

(58) Field of Classification Search ......... 348/373–376, 348/81; 39/25; 206/316.2
See application file for complete search history.

(56) References Cited

U.S. PATENT DOCUMENTS

| | | | | |
|---|---|---|---|---|
| 5,416,549 A | * | 5/1995 | Katsuyama et al. | 396/529 |
| 5,946,501 A | * | 8/1999 | Hayakawa | 396/25 |
| 6,128,441 A | * | 10/2000 | Kamata et al. | 396/25 |
| 6,138,826 A | * | 10/2000 | Kanamori et al. | 206/316.2 |
| 2002/0130963 A1 | * | 9/2002 | Gelbard | 348/360 |
| 2004/0174457 A1 | * | 9/2004 | Ma | 348/373 |

FOREIGN PATENT DOCUMENTS

| | | |
|---|---|---|
| JP | 57-171326 | 10/1982 |
| JP | 58-076823 | 5/1983 |
| JP | 59-061379 | 4/1984 |
| JP | 01-258562 | 10/1989 |
| JP | 05-236308 | 9/1993 |
| JP | 06-022177 | 1/1994 |
| JP | 06-105197 | 4/1994 |

(Continued)

OTHER PUBLICATIONS

U.S. Appl. No. 11/311,468, filed Dec. 20, 2005, Nakamura, et al.

(Continued)

*Primary Examiner*—Tuan V Ho
*Assistant Examiner*—Selam T Gebriel
(74) *Attorney, Agent, or Firm*—Oblon, Spivak, McClelland, Maier & Neustadt, P.C.

(57) ABSTRACT

An adapter device is disclosed to which a video camera can easily be attached. The adapter is compatible with both small and large camera lenses which may be attached directly to it. The adapter includes a receptacle which enables the video camera to be located within the adapter after being inserted through a rear opening. Once inserted, the adapter includes both mechanical and electrical connections to enable the camera to be connected to the adapter. A key mechanical connection is located at the front end of the adapter and it interfaces with a lens-unit mount of the camera. The electrical connection is located on the bottom inner surface of the adaptor and the connection interfaces with a terminal block on the video camera.

20 Claims, 12 Drawing Sheets

FOREIGN PATENT DOCUMENTS

| | | |
|---|---|---|
| JP | 07-222042 | 8/1995 |
| JP | 09-163200 | 6/1997 |
| JP | 2000-92352 | 3/2000 |
| JP | 3443919 | 6/2003 |
| JP | 2004-094066 | 3/2004 |

OTHER PUBLICATIONS

U.S. Appl. No. 11/312,733, filed Dec. 21, 2005, Nakamura, et al.
U.S. Appl. No. 11/313,703, filed Dec. 22, 2005, Nakamura, et al.

* cited by examiner

ADAPTER DEVICE AND VIDEO CAMERA DEVICE

CROSS REFERENCES TO RELATED APPLICATIONS

The present invention contains subject matter related to Japanese Patent Application JP 2005-001868 filed in the Japanese Patent Office on Jan. 6, 2005, the entire content of which is incorporated herein by reference.

BACKGROUND OF THE INVENTION

1. Field of the Invention

The present invention relates to an adapter device to which a video camera device is to be attached, and a video camera device.

2. Description of the Related Art

Video camera devices for business use include a small type to be used being carried on the shoulder of a camera man, and a large type to be used indoors being fixed on a tripod or the like. Also, there is available an adapter device intended to use such a small video camera device with functions of a large video camera device. The adapter device is to be used being fixed to the small video camera device and having a larger lens unit installed thereon. Therefore, when fixing the small video camera device to the adapter device, the video camera device should be connected to the adapter device mechanically as well as electrically.

SUMMARY OF THE INVENTION

It is therefore desirable to overcome the above-mentioned drawbacks of the related art by providing an adapter device to which a small video camera can easily be attached, and a video camera device.

It is also desirable to provide an adapter device to which a video camera can easily be handled and connected mechanically and electrically during a series of assembling steps, and a video camera device.

According to the present invention, there is provided an adapter device to which a video camera device is to be attached, the adapter device including: an adapter body having formed therein a receptacle in which the video camera device is to be installed and having formed at the rear end thereof an opening through which the video camera device is to be inserted; a mechanical connecting mechanism to be connected to the receptacle in the position of a lens-unit mount of the video camera device; and an electrical connecting mechanism to electrically connect the receptacle and video camera device, the video camera device being to be inserted first at the lens-unit mount thereof into the receptacle from the insertion opening at the rear end of the adapter body; the mechanical connecting mechanism being provided at the front end of the adapter body; and the electrical connecting mechanism being provided on the bottom of the receptacle to receive the terminal block of the video camera device.

According to the present invention, there is also provided a video camera device including a video camera and an adapter device to which the video camera is to be attached, wherein the adapter device including: an adapter body having formed therein a receptacle in which the video camera is to be installed and having also formed at the rear end thereof an opening through which the video camera is to be inserted; a mechanical connecting mechanism to be connected to the receptacle in the position of a lens-unit mount of the video camera; and an electrical connecting mechanism to electrically connect the receptacle and video camera, the video camera being to be inserted first at the lens-unit mount thereof into the receptacle from the insertion opening at the rear end of the adapter body; the mechanical connecting mechanism being provided at the front end of the adapter body; and the electrical connecting mechanism being provided on the bottom of the receptacle to receive the terminal block of the video camera.

The adapter device according to the present invention includes the electrical connecting mechanism to electrically connect the receptacle and video camera device to each other, the mechanical connecting mechanism is provided at the front end of the adapter body and the electrical connecting mechanism is provided on the bottom of the receptacle to receive the terminal block of the video camera device. So, the adapter body and video camera device are connected to each other mechanically and electrically during a series of assembling steps in which the video camera device is inserted first at the lens-unit mount thereof into the receptacle from the insertion opening at the rear end of the adapter body. That is, the video camera device can easily be attached to the adapter device.

DETAILED DESCRIPTION OF THE PREFERRED EMBODIMENTS

The present invention will be described in detail below concerning the video camera system as an embodiment thereof with reference to the accompanying drawings.

Figure 1:
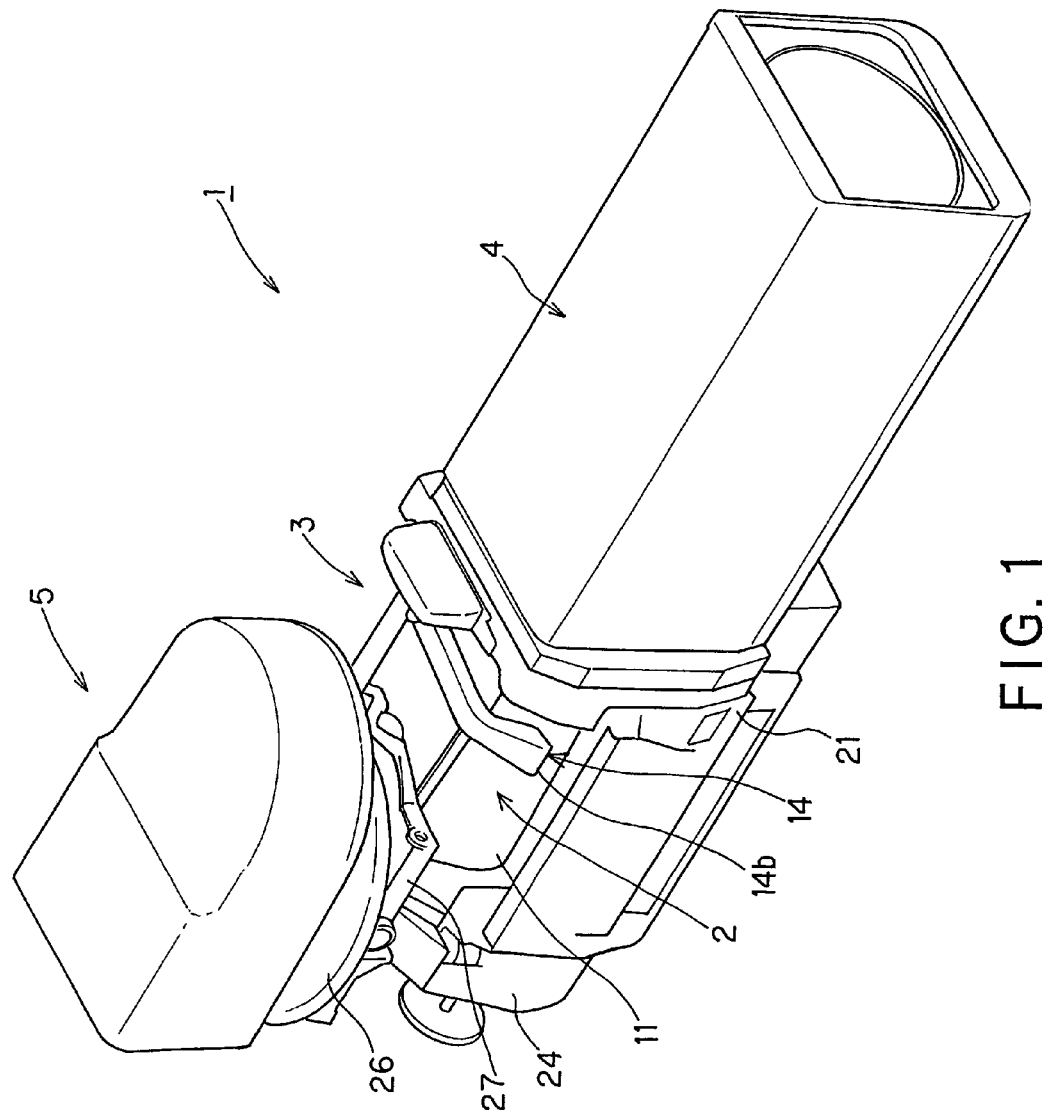
FIG. 1 is a perspective view of a video camera system according to the present invention.
Figure 2:
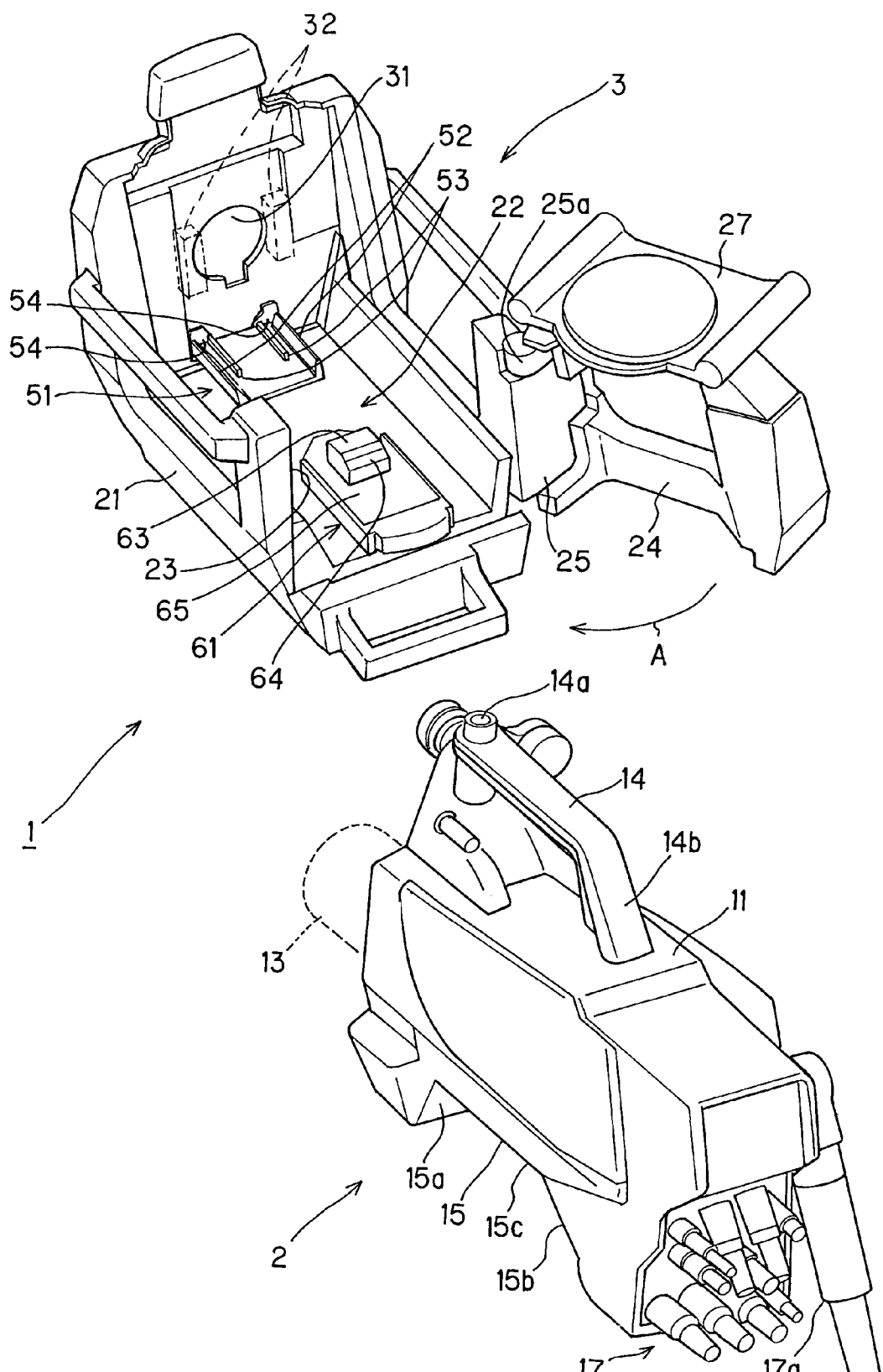
FIG. 2 is also a perspective view of the video camera device being attached to the adapter device.

As shown in FIGS. 1 and 2, the video camera system, generally indicated with a reference numeral 1, according to the present invention includes a high-performance small video camera device 2 for business use, and an adapter device 3 to which the video camera device 2 is to be attached. In this video camera system 1, a large lens unit 4 and viewfinder 5 are to be installed to the adapter device 3 having the small video camera device 2 attached thereto. This assembly is fixed on a tripod or the like to provide a large video camera device which is to be usable in a broadcast station or the like.

Figure 3:
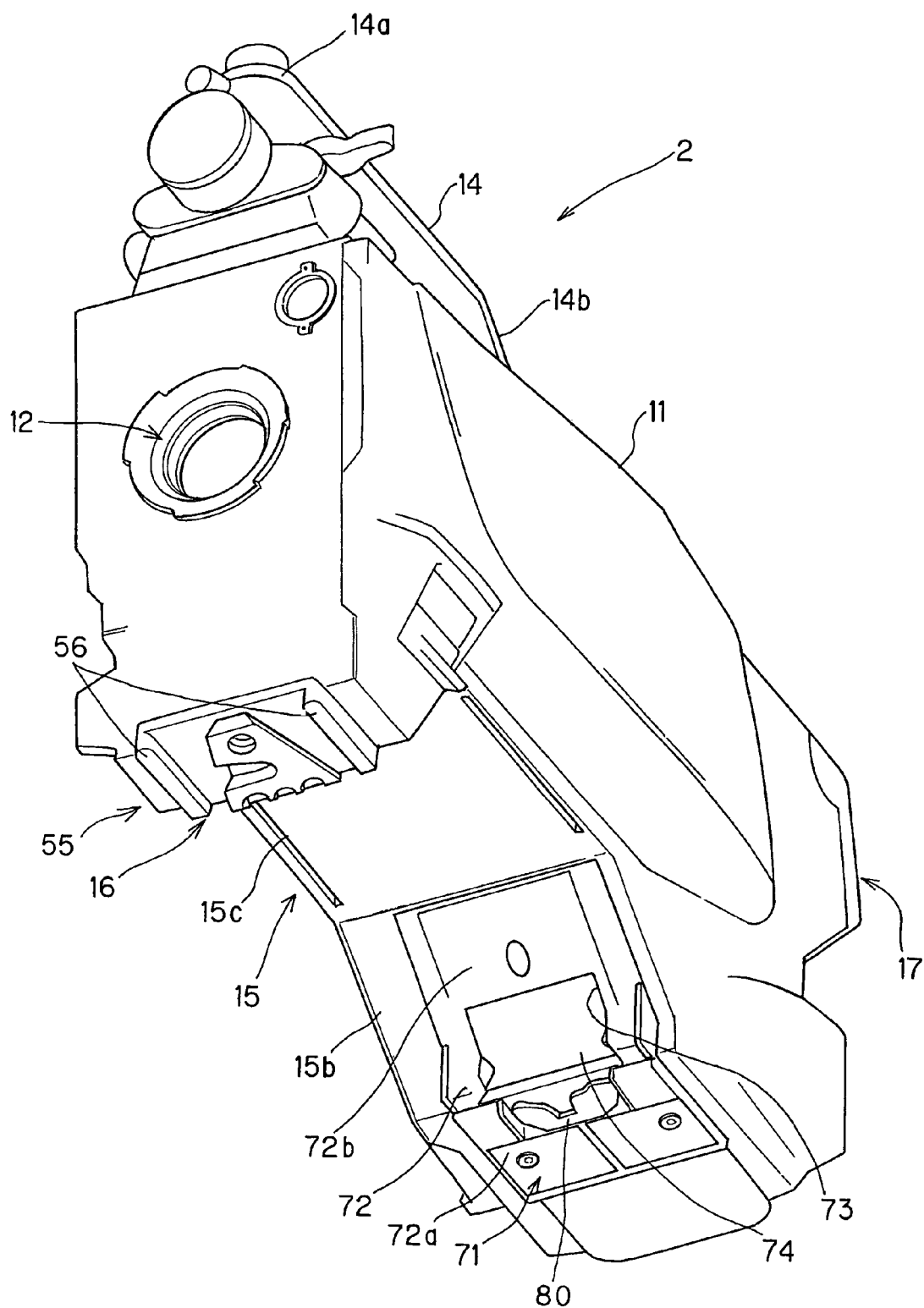
FIG. 3 is a perspective view, from the bottom side, of the video camera device.

More specifically, the video camera device 2 to be attached to the adapter device 3 includes a camera body 11 whose size is so large as to be carried on the shoulder of a user such as camera man or the like, as shown in FIGS. 2 and 3. The camera body 11 has a lens-unit mount 12 provided at the front end thereof. The lens-unit mount 12 includes a lens mount as disclosed in the Japanese Patent No. 3443919, to which a lens unit can be removably installed. To the lens-unit mount 12, a lens unit 13 is to be installed which is smaller than the large lens unit 4 to be installed to the adapter device 3. It should be noted that when the small lens unit 13 is to be installed to the adapter device 3, it is to be detached from the lens-unit mount 12 of the camera body 11.

On the top of the camera body 11, there is provided a carrying grip 14 the user can hold for carrying. The carrying grip 14 is shaped to have the general form of an angle bracket, and it is fixed at opposite ends thereof to the top of the camera body 11. More specifically, the carrying grip 14 is installed at one end 14a thereof pivotably at the top front end of the camera body 11 and at the other end 14b thereof removably at the rear end of the camera body 11. When the camera body 11 is to be attached to the adapter device 3 and the viewfinder 5 is to be installed to the adapter device 3, the carrying grip 14 is to be removed at the other end 14b thereof from the camera body 11 in order to install the viewfinder 5 in place, and turned about the one end 14a at the front end of the camera body 11 to outside from above the camera body 11.

The camera body 11 has provided at the rear side thereof an on-shoulder carrying portion 15 extending from the front to rear end. When making a video shoot, the user will hold the camera body 11 with the on-shoulder carrying portion 15 on the shoulder. The on-shoulder carrying portion 15 includes a front bevel portion 15a, rear bevel portion 15b and a generally flat portion 15c extending contiguously between the front and rear bevel portions 15a and 15b. At the rear bevel portion 15b, there is provided a terminal mechanism 71 for electrical connection with the adapter device 3. When the camera body 11 is being detached from the adapter device 3, the terminal mechanism 71 is protected being covered with a shutter member 74.

Also, an insertion guide 16 is provided on the front bottom of the on-shoulder carrying portion 15 at the bottom of the camera body 11 to guide the camera body 11 going to be attached to the adapter device 3. When the camera body 11 is inserted first at the front end of the lens-unit mount 12 into the adapter device 3 from the rear end of the latter, the insertion guide 16 will guide the lens-unit mount 12 being fixed to the front portion of the adapter device 3.

Note that at the rear portion of the camera body 11, there is provided a connecting terminal block 17 to which connecting cords 17a including a power cord, signal cords for sending and receiving signals such as video and audio signals, etc. are to be connected.

When attaching the video camera device 2 constructed as above to the adapter device 3, it is inserted first at the front portion at which the lens-unit mount 12 is provided into the adapter device 3 with the small lens unit 13 being removed from the lens-unit mount 12 at the front portion of the camera body 11.

The adapter device 3 to which the video camera device 2 is to be attached includes a body 21 as shown in FIG. 2. The adapter body 21 has provided therein a receptacle 22 in which the camera body 11 of the video camera device 2 is to be installed. The receptacle 22 is open at the top thereof for installation of the viewfinder 5 and has formed at the rear end thereof an opening 23 for insertion of the camera body 11. The insertion opening 23 is closed and opened by a lid 24 installed pivotably to the rear end of the adapter body 21.

The lid 24 is supported at the base end thereof with a hinge 25 to the one rear end of the adapter body 21 to be pivotable in the direction of arrow A and also in a direction opposite to the direction of arrow A in FIG. 2. To one rear lateral end of the adapter body 21, there is fixed a vertical pivot shaft 25a of the hinge 25 supporting the lid 24. It should be noted that the lid 24 has a lock provided at the other end thereof and the adapter body 21 has a locking mechanism provided at the lateral end thereof opposite to the hinge 25. The lock works with the locking mechanism to lock the lid 24.

As shown in FIG. 1, the lid 24 has disposed at the top thereof a mount base 26 on which the viewfinder 5 is to be installed. The viewfinder 5 to be installed on the mount base 26 is, for example, a video monitor of a relatively large type having an approximately 9-inch size and weighing about 8 kg for easier checking of an image on its screen. Since the lid 24 is pivotably supported on the rear end of the adapter body 21 by means of the hinge 25 having the vertical pivot shaft 25a, the lid 24 can be prevented from being abruptly opened due to the weight of the large viewfinder 5 installed on the mount base 26 when it is operated. If the pivot shaft 25a of the hinge 25 is provided horizontally at the lower rear end of the adapter body 21, the lid 24 is likely to be opened being depressed by the large viewfinder 5 installed on the mount base 26.

Figure 4:
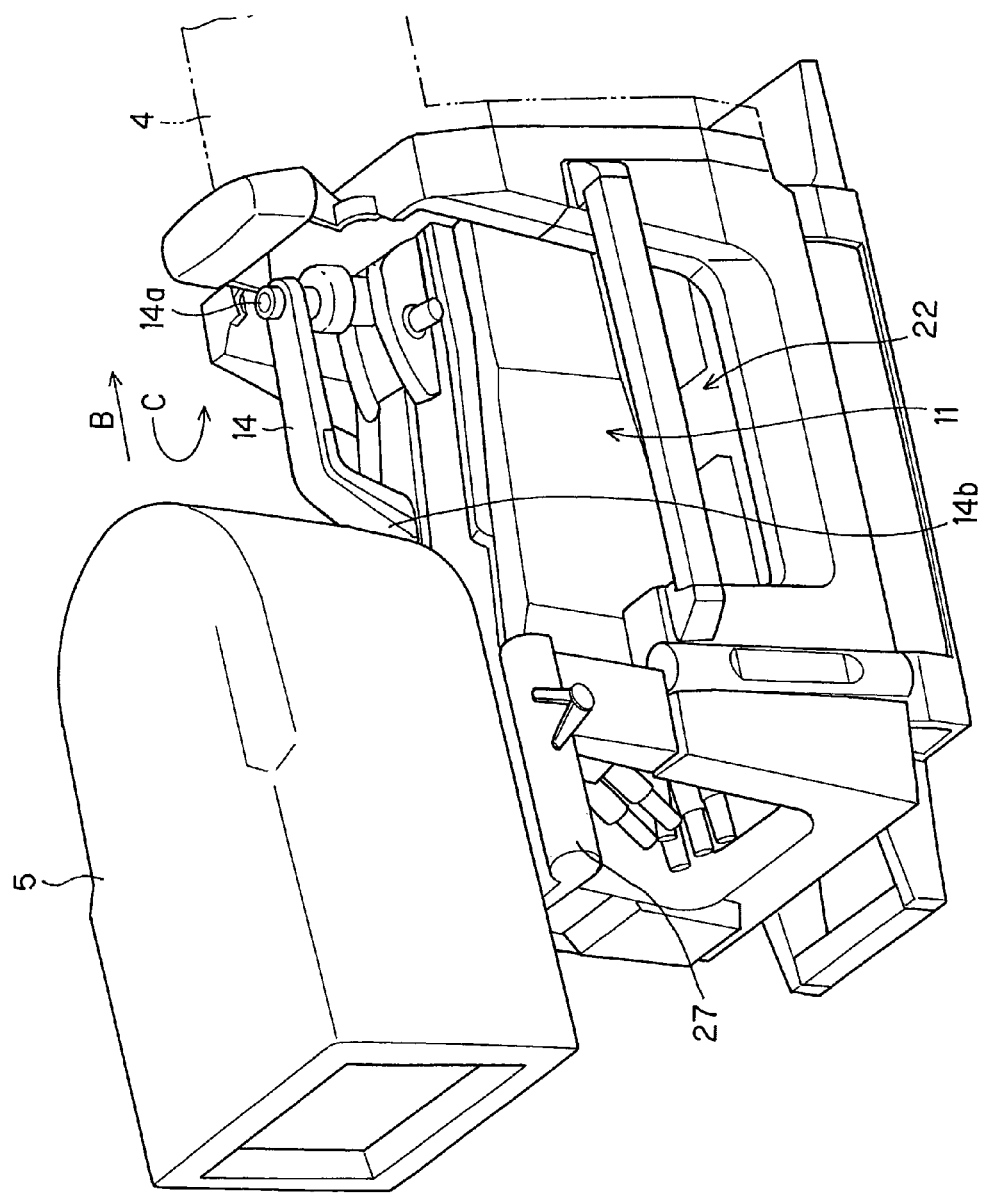
FIG. 4 is a perspective view of a viewfinder located at the rear end of the adapter device.
Figure 5:
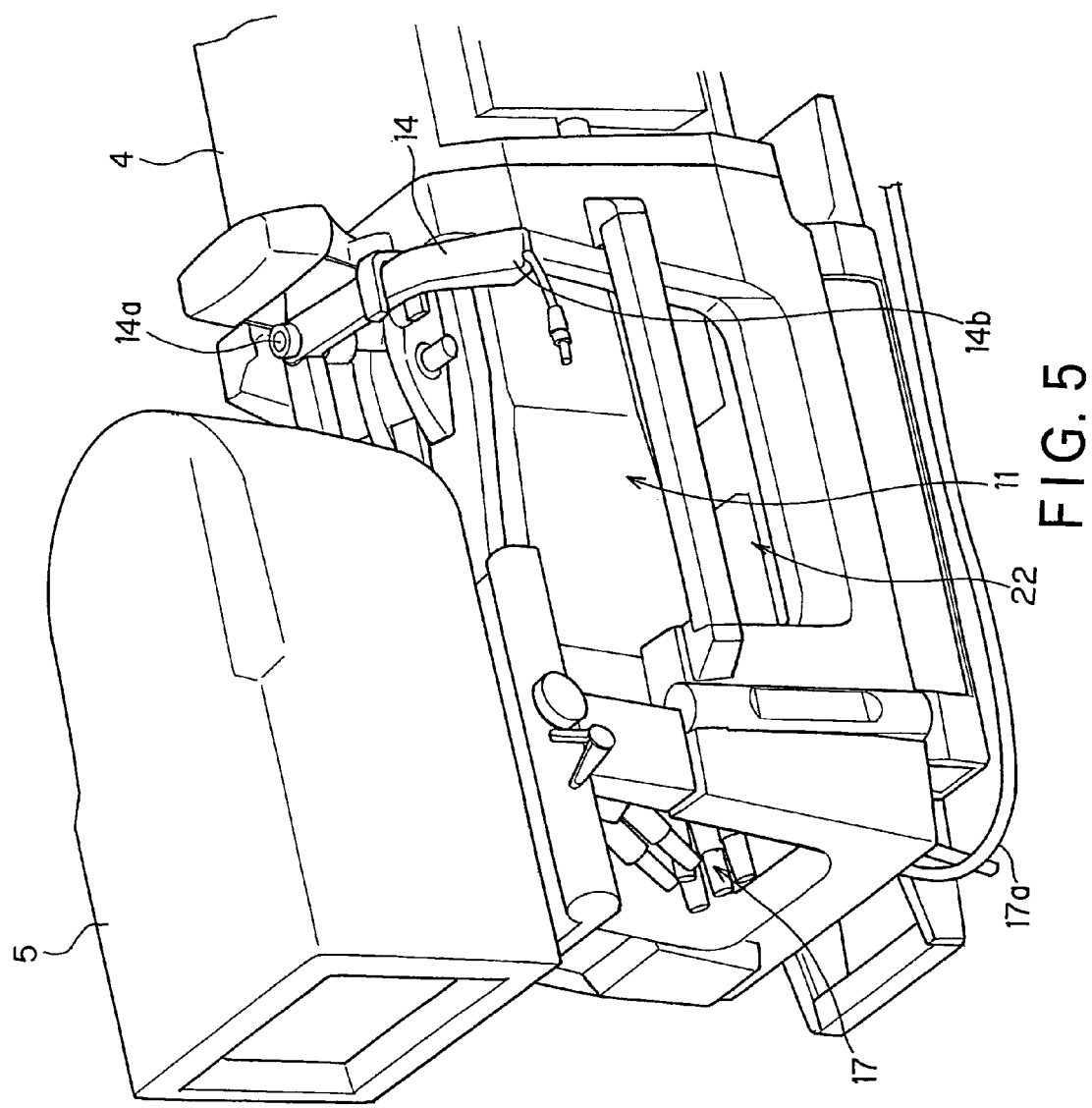
FIG. 5 is a perspective view of the viewfinder having been slid to the front end of the adapter device.

The mount base 26 provided at the top of the lid 24 is installed with a slider 27 placed under it as shown in FIG. 2. The slider 27 is provided to slide the mount base 26 from the rear to front end of the adapter body 21, namely, in the direction of arrow B in FIG. 4, with the insertion opening 23 of the adapter body 21 being closed by the lid 24. The viewfinder 5 should preferably be installed as near the optical axis of the lens-unit mount 12 as possible, and the adapter device 3 having the video camera device 2 attached thereto should preferably be shorter as a whole for easier handling. On this account, the adapter device 3 is adapted for installing the viewfinder 5 on the top of the lid 24 that opens and closes the insertion opening of the adapter body 21 in a position where the viewfinder 5 can be nearer to the optical axis of the lens-unit mount 12. Further the adapter device 3 is designed such that the slider 27 installed on the mount base 26 can be slid from the rear to front end of the adapter device 21, that is, in the direction of arrow B in FIG. 4, with the insertion opening 23 being closed by the lid 24 until the total length of the adapter device 3 having the video camera device 2 attached thereto is as short as possible for easier handling as shown in FIG. 5.

When the viewfinder 5 is installed on the mount base 26 and lid 24 closes the insertion opening 23 of the adapter body 21, the grip 14 of the camera body 11 installed in the receptacle 22 will come to before the viewfinder 5. On this account, whenever the viewfinder 5 is slid from the rear to front end of the adapter body 21, first the other end 14b of the grip 14 is detached from the camera body 11, and then the grip 14 is turned about the one end 14a thereof in the direction of arrow C in FIG. 4 to have the body portion and other end 14b thereof moved out from on the top of the camera body 11 as shown in FIG. 5. Thus, the viewfinder 5 becomes slidable with the slider 27 from the rear to front end of the adapter body 21. As the slider 27 is slid in the direction of arrow B in FIG. 4 as above, the viewfinder 5 is moved from the rear end of the adapter body 21 toward the front end as shown in FIG. 5.

Since the grip 14 of the camera body 11 attached to the adapter body 21 is turned from on the camera body 11 when installing the viewfinder 5 on the mount base 26 as above, the viewfinder 5 can be moved toward the front end of the adapter body 21, so that the adapter device 3 can be reduced in length as a whole.

As shown in FIG. 2, the camera body 11 of the video camera device 2 is inserted first at the front end thereof where the lens-unit mount 12 is provided into the receptacle 22 from the insertion opening 23 of the body 21 of the adapter 3. An imaging aperture 31 is formed in the front wall of the receptacle 22 of the adapter body 21 correspondingly to the lens-unit mount 12 of the camera body 11 which is to be attached to the adapter device 3. The imaging aperture 31 provides an interface between the large lens unit 4 which is to be installed at the front of the adapter body 21 and the lens-unit mount 12 of the camera body 11 which is to be installed in the receptacle 22. Thus, the lens-unit mount 12 of the camera body 11 can be connected to the imaging aperture 31 to have the optical axis thereof aligned with the large lens unit 4 which is to be installed at the front of the adapter body 21.

Figure 6:
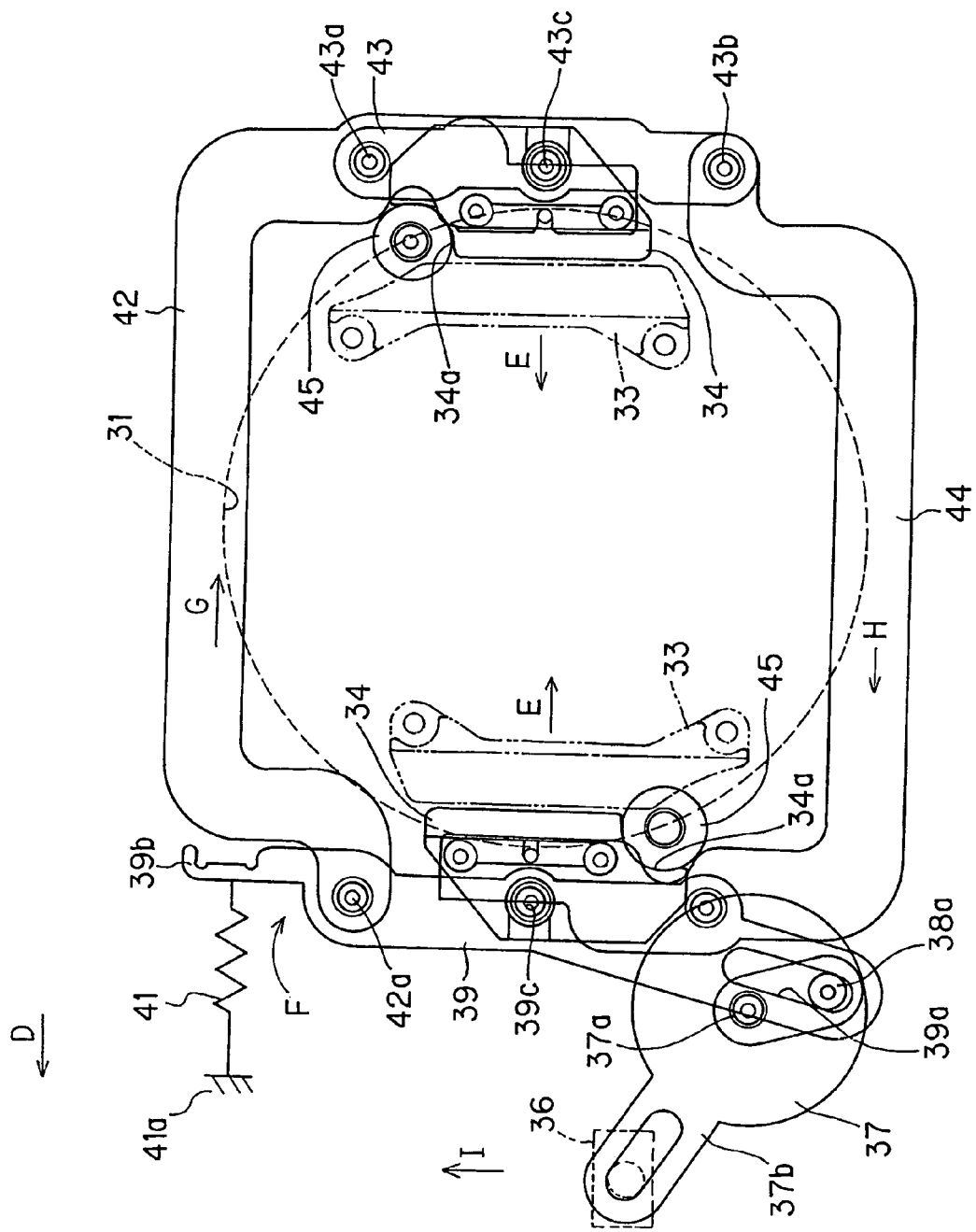
FIG. 6 is a plan view of the mechanical connecting mechanism to mechanically connect the camera body to the adapter body, showing the camera body not yet attached to the adapter device.
Figure 7:
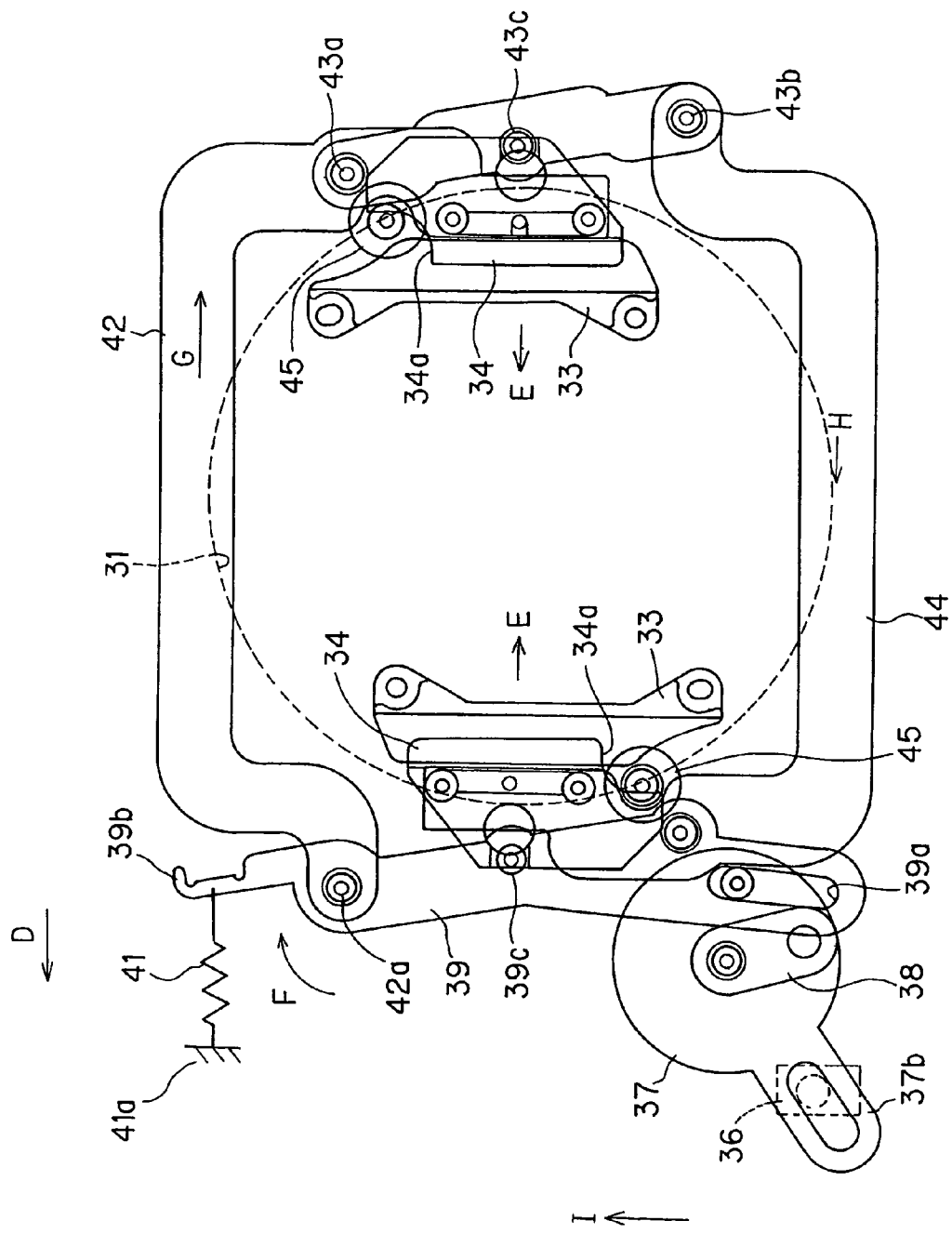
FIG. 7 is also a plan view of the mechanical connecting mechanism to mechanically connect the camera body to the adapter body, showing the camera body attached to the adapter device.

As shown in FIG. 2, there is provided a mechanical connecting mechanism 32 to connect the lens-unit mount 12 of the camera body 11 to the imaging aperture 31 in the adapter body 21. The mechanical connecting mechanism 32 has a pair of sliding engagement members 34 that rest on a plurality (one pair in this embodiment) of engagement members 33 provided on either side of the lens-unit mount 12 of the camera body 11 as shown in FIGS. 6 and 7. The sliding engagement members 34 are disposed, for example, opposite to each other. When the lens-unit mount 12 of the camera body 11 is installed, the sliding engagement members 34 rest on the engagement members 33 of the lens-unit mount 12 and thus the lens-unit mount 12 can be held in position in the imaging aperture 31.

There is also provided a linkage 35 to slide the sliding engagement members 34. The linkage 35 includes a locking lever 37 having a control 36 and provided at the front end of the adapter body 21 to face the large lens unit 4. The locking lever 37 is installed pivotably on a pivot 37a at the front end of the adapter body 21, and has the control 36 fitted to an arm portion 37b thereof. Also, the locking lever 37 has provided thereon an engagement projection 38a which is engaged in an elongated hole 39a formed in one end portion of a first link arm 39. The first link arm 39 has formed at the other end 29b thereof a retaining portion 39b on which a forcing member 41 is hooked. The forcing member 41 is for example a helical spring of which the one end is hooked on the retaining portion 39b of the first link arm 39 and the other end is fixed to a retainer 41a at the front of the adapter body 21. Thus, the forcing member 41 always forces the first link arm 39 in the direction of arrow D in FIG. 6. Also, the first link arm 39 is supported at the middle thereof pivotably about a pivot 39c at the front end of the adapter body 21.

A second link arm 42 is connected to the first link arm 39. The second link arm 42 is provided around the imaging aperture 31 in the adapter body 21, and has one end thereof installed pivotably on a pivot 42a at the other end of the first link arm 39. The second link arm 42 has a fourth link arm 44 installed to the other end thereof by means of a third link arm 43. It has one of the sliding engagement members 34 fixed to the other end thereof with a screw or the like. The third link arm 43 is installed at one end thereof pivotably on a pivot 43a at the other end of the second link arm 42, and at the other end thereof pivotably on a pivot 43b at one end of the fourth link arm 44. Also, the third link arm 43 is supported at the middle thereof pivotably on a pivot 43c at the front end of the adapter body 21.

The forth link arm 44 is installed opposite to the second link arm 42 across the imaging aperture 31. It is installed at one end thereof pivotably on a pivot 43b of the third link arm 43, and has the other sliding engagement member 34 fixed to the other end with a screw or the like.

Each of the sliding engagement members 34 installed to the second and fourth link arms 42 and 44, respectively, has formed therein an engagement concavity 34a in which a plunger 45 provided at the front end of the adapter body 21 is to selectively be engaged. When the camera body 11 is not yet attached to the adapter device 3, the plunger 45 is engaged in the engagement concavity 43a in the sliding engagement member 34. When the camera body 11 is attached to the adapter device 3, the plunger 45 is pressed toward the front end of the camera body 11 and thus disengaged from the engagement concavity 34a.

The mechanical connecting mechanism 32 constructed as above is in a state as shown in FIG. 6 when the camera body 11 is not yet installed in the receptacle 22 of the adapter body 21. That is, the plunger 45 has the free end thereof projected into the receptacle 22 and engaged in the engagement concavity 34a in the sliding engagement members 34 having been slid in a direction opposite to the direction of arrow E in FIG. 6, that is, in a direction in which they are moved away from each other. As above, the first link arm 39 is forced by the forcing member 41 in the direction of arrow D in FIG. 6. However, since each of the sliding engagement members 34 rests on the corresponding plunger 45, the first link arm 39 is turned in the direction of arrow F in FIG. 6, second link arm 42 is moved in the direction of arrow G in FIG. 6, and the fourth link arm 44 is moved in the direction of arrow H in FIG. 6. Therefore, the sliding engagement members 34 fixed to the second and fourth link arms 42 and 44, respectively, are held in positions to which they have been slid in directions opposite to the directions of arrows E in FIG. 6, that is, away from the imaging aperture 31.

When the camera body 11 is inserted first at the front end thereof where the lens-unit mount 12 is provided into the receptacle 22 from the insertion opening 23 in the adapter body 21 as shown in FIG. 2, the lens-unit mount 12 will first be inserted into the imaging aperture 31. At this time, the engagement member 33 of the lens-unit mount 12 will also be inserted into the imaging aperture 31, and the plunger 45 projecting toward the receptacle 22 will be depressed at the free end thereof by the front end of the camera body 11. Then, the plunger 45 will be disengaged from the engagement concavity 34a in the sliding engagement member 34. Then, the first link arm 39 will be turned being forced by the forcing member 41 in a direction opposite to the direction of arrow F in FIG. 6 and the second link arm 42 will be moved in a direction opposite to the direction of arrow G in FIG. 6, and the fourth link arm 44 will be moved in a direction opposite to the direction of arrow H in FIG. 6. Thus, the sliding engagement members 34 fixed to the second and fourth link arms 42 and 44, respectively, will slide in the direction of arrow E in FIG. 6 in which they will move toward each other. Thus, the sliding engagement members 34 will rest on the engagement members 33, respectively, of the lens-unit mount 12 facing the imaging aperture 31 as shown in FIG. 7. Thus, the lens-unit mount 12 will be held in position in relation to the imaging aperture 31.

Note that to align the lens-unit mount 12 more accurately with the imaging aperture 31, a positioning projection provided at the front end of the camera body 11 or at the front end of the adapter body 21 may be engaged in a positioning hole formed at the front end of the adapter body 21 or of the camera body 11.

Also note that to take out the camera body 11 from inside the receptacle 22 of the adapter body 21, first the control 36 provided at the front end of the adapter body 21 is moved in the direction of arrow I in FIG. 7. Then, as the locking lever 37 is turned, the first link arm 39 is pivoted in the direction of arrow F in FIG. 7 against the action of the forcing member 41. In conjunction with this pivoting of the first link arm 39, the second link arm 42 is moved in the direction of arrow G in FIG. 6 while the fourth link arm 44 is moved in the direction of arrow H in FIG. 6. Thus, the sliding engagement members 34 are slid in a direction opposite to the direction of arrow E in FIG. 7 and disengaged from the engagement members 33, respectively, of the lens-unit mount 12, so that the lens-unit mount 12 can be removed from the imaging aperture 31. As the camera body 11 is removed, the plunger 45 will be projected into the receptacle 22 of the adapter body 21 and engaged in the engagement concavity 34*a* in the sliding engagement member 34. Thus, the camera body 11 is held ready for installation as in a state shown in FIG. 6.

Note here that the camera body 11 is guided for insertion by an insertion guide mechanism 51 provided on the bottom of the receptacle 22 of the adapter body 21 as shown in FIGS. 2 and 3 until the camera body 11 is installed in the receptacle 22 of the adapter body 21, that is, up to connection to the mechanical connecting mechanism 32.

As shown in FIG. 2, the insertion guide mechanism 51 provided on the bottom of the receptacle 22 of the adapter body 21 includes a pair of outer guides 52 formed adjacent to the front end of the adapter body 21 to extend toward the rear end and a pair of inner guides 53 formed inside the outer guides 52. The inner guide portions 53 are formed shorter than the outer guides 52 for easier insertion of a guide member provided on the bottom of the camera body 11.

Also, a guide mechanism 55 is provided on the front bottom portion of the camera body 11. It is to be engaged in the insertion guide mechanism 51. The guide mechanism 55 includes pair of guide rails 56 which is to be introduced into guide recesses 54, respectively, formed between the outer guides 52 and inner guides 53 of the insertion guide mechanism 51 as shown in FIG. 3.

Once the camera body 11 is inserted from the insertion opening 23 at the rear end of the adapter body 21, the guide rails 56 of the guide mechanism 55 are inserted into the guide recesses 54, respectively, of the insertion guide mechanism 51 before the lens-unit mount 12 is connected to the mechanical connecting mechanism 32, so that the camera body 11 will be guided for insertion up to connection to the mechanical connecting mechanism 32.

Also, the adapter body 21 is electrically connected to the camera body 11 simultaneously with the connection of the latter to the mechanical connecting mechanism 32 of the receptacle 22 as shown in FIG. 2. To this end, there is provided on the rear bottom portion of the receptacle 22 an electrical connecting mechanism 61 to electrically connect the camera body 11 to the adapter body 21 simultaneously with the mechanical connection between them as shown in FIG. 8.

Figure 8:
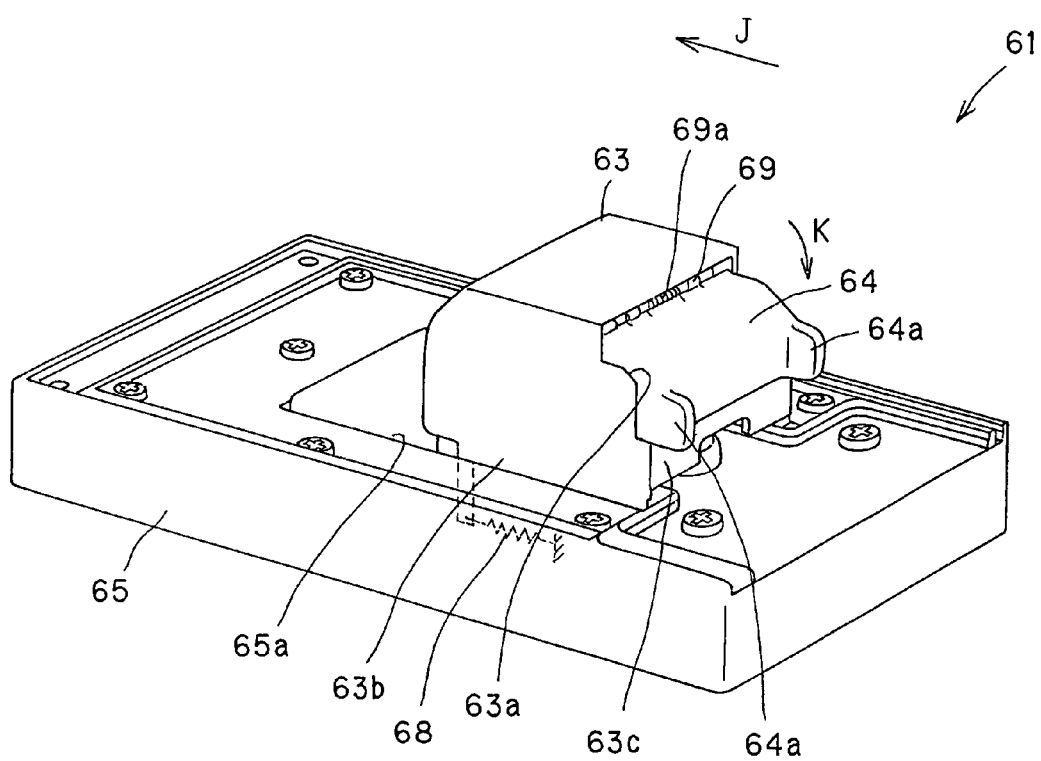
FIG. 8 is a perspective view of the electrical connecting mechanism of the adapter device, showing a connector being covered with a cover member and lid.
Figure 9:
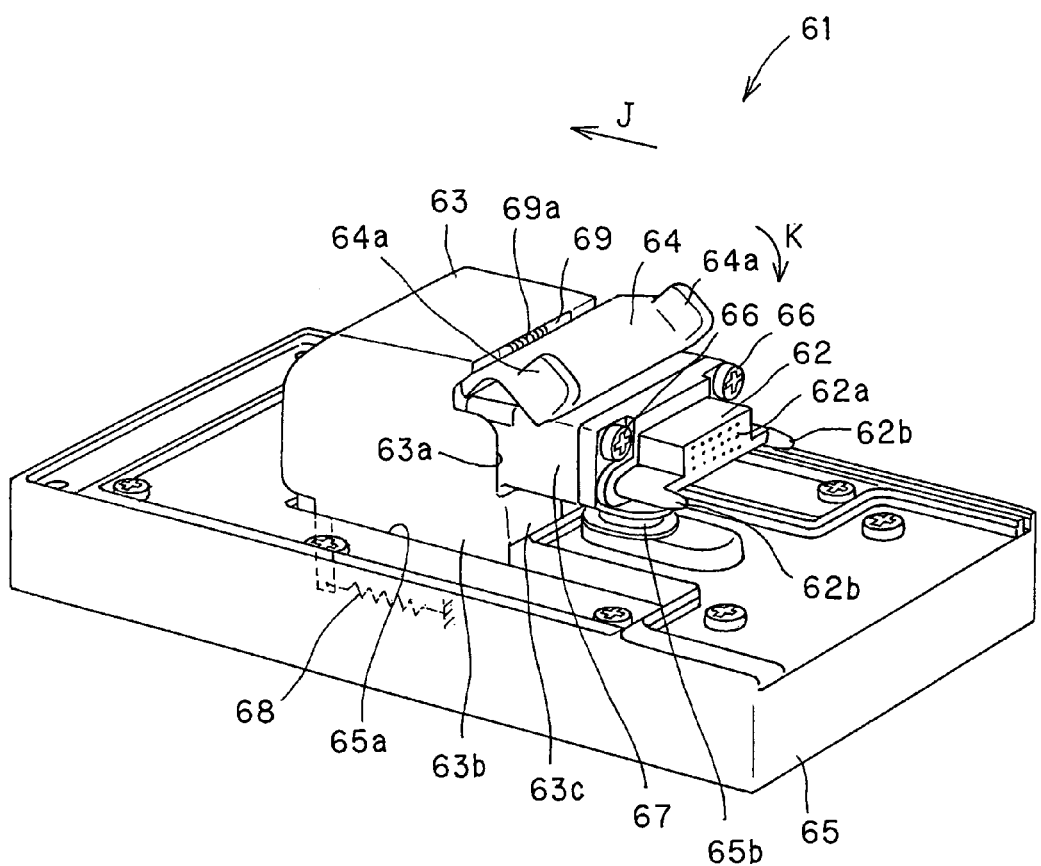
FIG. 9 is a perspective view of the electrical connecting mechanism of the adapter body, showing that the adapter device is connectable to a terminal mechanism of the video camera.

More specifically, the electrical connecting mechanism 61 includes a connector 62 for electrical connection to a terminal block 79*a* of a terminal mechanism 71 provided on the bottom of the camera body 11, cover member 63 provided to cover the connector 62 and a lid 64 fixed to the cover member 63 to open and close an exposed portion of the connector 62, as shown in FIGS. 8 and 9.

The connector 62 is fixed with screws 66 to a base 65 which is to be installed integrally to the bottom of the receptacle 22 of the adapter body 21. More particularly, the connector 62 is fixed with the screws 66 to a fixture 67 from the side of a connecting portion 62*a* to which the terminal block 79*a* of the terminal mechanism 71 at the camera body 11, directed toward the rear end of the adapter body 21, is to electrically be connected. Since the connecting portion 62 to which the terminal block 79*a* of the terminal mechanism 71 of the camera body 11 is electrically connected is disposed being directed toward the rear end of the adapter body 21, the connector 62 can be electrically connected to the terminal block 79*a* of the terminal mechanism 71 of the camera body 11 when the camera body 11 is inserted into the receptacle 22. On either side of the connecting portion 62*a* of the connector 62, there is provided an engagement pin 62*b* which is to be engaged into an engagement hole 79*b* in a terminal member 79 of the camera body 11. With the engagement pins 62*b* engaged in the engagement holes 79*b* in the terminal member 79, it is possible to protect the electrical connection between the connecting portion 62*a* and terminal block 79*a*.

The base 65 has installed thereon the cover member 63 which is slidable in the direction of arrow J in FIG. 8 in which the camera body 11 is inserted into the receptacle 22. The connector 62 is covered with the cover member 63. The cover member 63 is formed generally rectangular and hollow to provide a space in which the connector 62 is to be disposed, and has formed at one lateral side thereof a connector opening 63*a* through which the connecting portion 62*a* of the connector 62 is exposed to outside. For sliding in the direction of arrow J in FIG. 8 in which the camera body 11 is to be inserted into the receptacle 22, the opposite lateral sides 63*b* of the cover member 63, directed in the direction of sliding, provide sliding guides and these sliding guides 63*b* are engaged in guide recesses 65*a*, respectively, formed in the base 65. The cover member 63 is forced by a forcing member 68 such as tensile helical spring or the like disposed in the base 65 in the direction of arrow J in FIG. 8 which is opposite to the direction in which the camera body 11 is to be inserted.

The connector opening 63*a* in the cover member 63, through which the connecting portion 62*a* of the connector 62 is exposed to outside, is closed by the lid 64. The lid 64 is supported pivotably on a pivot 69 provided along the upper end of the connector opening 63*a*, and forced by a forcing member 69*a* such as torsional helical spring or the like for turning in the direction in the direction of arrow K in FIG. 8 in which the connector opening 63*a* will be closed. On either side of the lid 64, there is formed a projecting unlocking tab 64*a* that unlocks the terminal mechanism 71 of the camera body 11. The bottom of the connector opening 63*a* provides a to-be-pressed portion 63*c* which is to be pressed by a pressing portion 73*c* of a mount plate 72 of the terminal mechanism 71 of the camera body 11.

Note that the base 65 has a positioning projection 65*b* formed under the connector 62.

The electrical connecting mechanism 61 constructed as above takes a state as shown in FIG. 8 when the camera body 11 is not yet installed in the receptacle 22 of the adapter body 21. More specifically, the cover member 63 has been slid by the forcing member 68 disposed in the base 65 to the rear end of the receptacle 22 of the adapter body 21, that is, in a direction opposite to the direction of arrow J in FIG. 8, and the lid 64 to close the connector opening 63*a* of the cover member 63 has been turned under the action of the forcing mechanism 69a in the direction of arrow K in FIG. 8 in which the connector opening 63a will be closed. Therefore, the connector 62 is covered with the cover member 63 and the connector opening 63a is closed. Namely, the connector 62 is protected.

Figure 10:
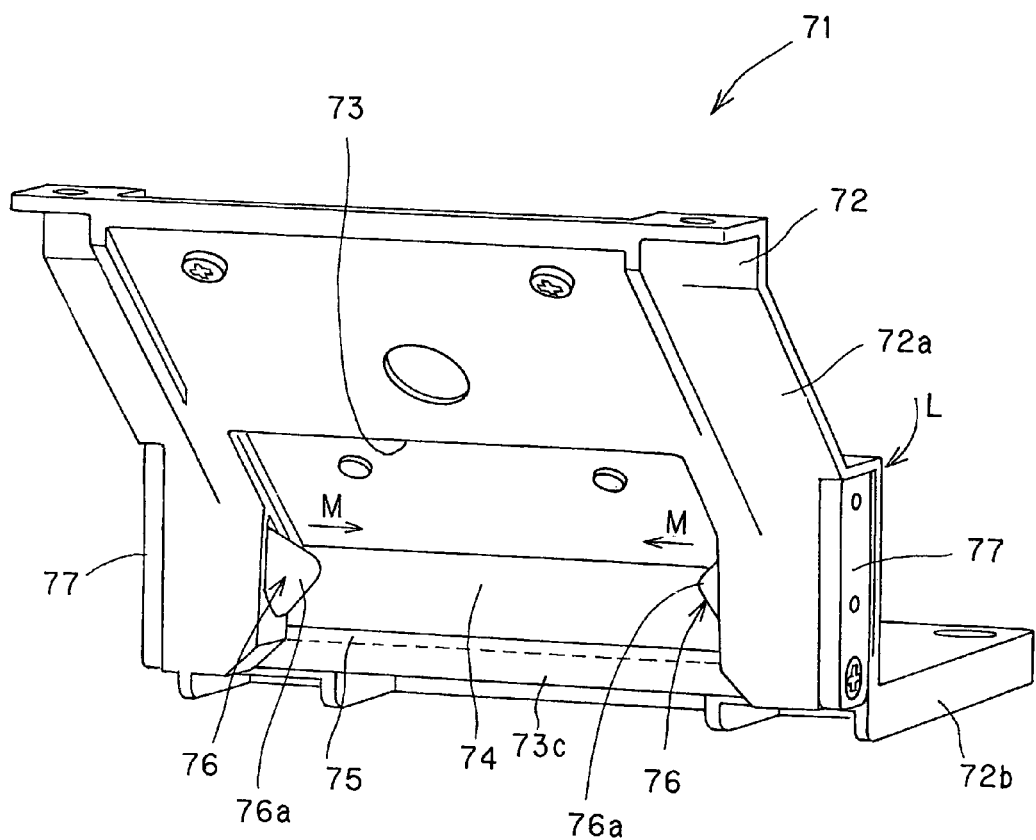
FIG. 10 is a perspective view of the terminal mechanism of the camera body, showing a shutter covering a terminal leading opening.
Figure 11:
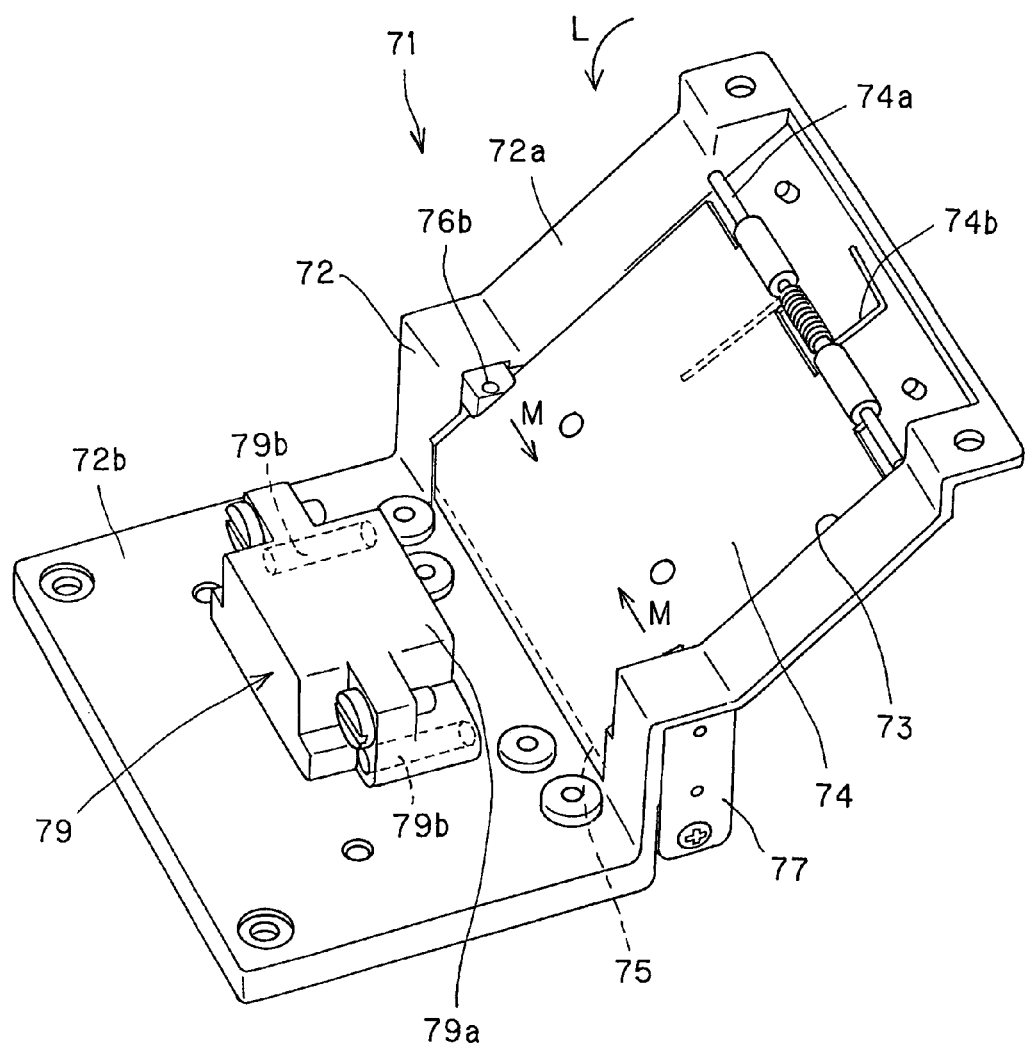
FIG. 11 is a perspective view of the terminal mechanism of the camera body, showing the shutter uncovering the terminal leading opening.

The terminal mechanism 71 of the camera body 11, connected to the electrical connecting mechanism 61 provided on the adapter body 21 is disposed to extend on the rear bevel portion 15b and flat portion 15c of the on-shoulder carrying portion 16 on the bottom of the camera body 11 as shown in FIG. 3. More specifically, the terminal mechanism 71 has a mount plate 72 formed generally L-shaped to extend along the rear bevel portion 15b and flat portion 15c of the on-shoulder carrying portion 16 as shown in FIGS. 10 and 11. The mount plate 72 includes a flat portion 72a and bevel plate portion 72b. The bevel plate portion 72b has a terminal opening 73 formed adjacent to the flat portion 72a. The terminal block of the camera body 11 is exposed to outside through the terminal opening 73. The terminal opening 73 is formed generally rectangular and opened and closed by a shutter member 74.

The shutter member 74 is supported pivotably on a pivot 74a disposed along the upper end of the terminal opening 73, and forced by a forcing member 74b such as torsional helical spring or the like for turning in the direction of arrow L in FIG. 10 in which the terminal opening 73 will be closed. The shutter member 74 is limited from turning in the direction of arrow L in FIG. 10 by a turn limiter 75 provided along the lower end of the terminal opening 73.

Figure 12:
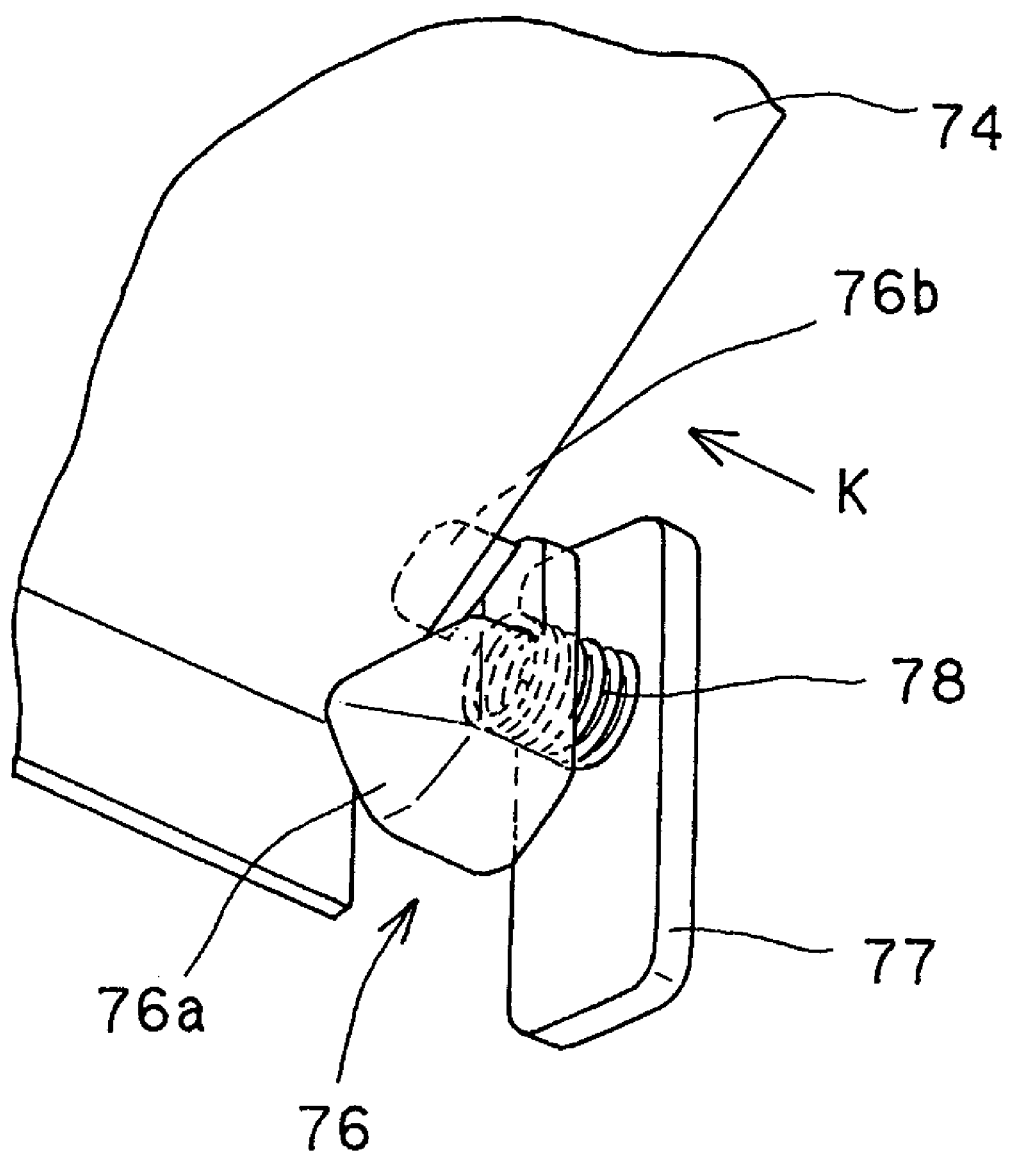
FIG. 12 is a perspective view of a substantial portion of the terminal mechanism, showing the shutter being locked.

On either side of the bottom of the terminal opening 74, a locking member 76 for the shutter member 74 is disposed in a mount portion 76c provided inside the mount plate 72 as shown in FIGS. 10 to 12. The locking member 76 includes a locking control 76a which is to be pressed by the unlocking tab 64a of the lid 64 of the electrical connecting mechanism 61 of the receptacle 22 of the adapter body 21, and a locking piece 76b which locks the turning in a direction opposite to the direction of arrow L in FIG. 10 in which the terminal opening 73 of the shutter member 74 will be opened. A lateral edge of the shutter member 74 is positioned between the locking control 76a and locking piece 76b. The locking member 76 is disposed inside the mount portion 76c, and forced by an elastic member 78 such as helical spring or the like disposed between the locking member 76 and a closing plate 77 to close the mount portion 76c in the direction of arrow M in FIG. 11 in which it will be projected into the terminal opening 73.

Also, on the flat portion 72a of the mount plate 72, there is fixed the terminal block 79a of the terminal member 79 electrically connected to the connecting portion 62a of the connector 62 of the electrical connecting mechanism 61 at the receptacle 22 of the adapter body 21 so that the terminal opening 73 is directed outward. On either side of the terminal block 79a, there is formed an engagement hole 79b in which the engagement pin 62b provided on the connector 62 is to be engaged.

The lower end of the terminal opening 73 in the mount plate 72 provides a pressing portion 73c that presses the to-be-pressed portion 63c of the cover member 63 of the electrical connecting mechanism 61. Also, on the flat portion 72a of the mount plate 72, there is provided a positioning member 80 which is to be engaged on a positioning projection 65b of the electrical connecting mechanism 61. Being engaged on the positioning projection 65b of the electrical connecting mechanism 61, the positioning projection 80 protects the electrical connection when the camera body 11 is electrically connected to the adapter body 21.

In the terminal mechanism 71 constructed as above, the shutter member 74 closes the terminal opening 73 in the mount plate 72 to protect the internal terminal block 79a. At this time, the shutter member 74 is engaged on the locking piece 76b of the locking member 76 and locked to close the terminal opening 73.

As having been illustrated and described in the foregoing, the camera body 11 is inserted first at the imaging portion 12 thereof into the receptacle 22 of the adapter body 21 from the insertion opening 23 as shown in FIG. 2. Once the camera body 11 is installed in the receptacle 22 of the adapter body 21, the locking control 76a of the locking member 76 of the terminal mechanism 71 of the camera body 11 is pressed by the unlocking tab 64a provided at either side of the lid 64 so that the shutter member 74 of the terminal mechanism 71 and the locking piece 76b are disengaged from each other as shown in FIGS. 8 to 10. Thus, the terminal mechanism 71 of the camera body 11 is unlocked. Next, the to-be-pressed portion 63c of the cover member 63 is pressed by the pressing portion 73c of the mount plate 72 of the terminal mechanism 71, and the cover member 63 is slid against the action of the forcing member 68 in the direction in which the camera body 11 is inserted, that is, in the direction of arrow J in FIG. 8. Then, the lid 64 fixed to the cover member 63 is pressed from inside by the heads of the screws 66 fixing the connector 62 and thus turned against the force of the forcing member 69a in a direction opposite to the direction of arrow K in FIG. 8 to expose the connecting portion 62a of the connector 62 to outside. At this time, the lid 64 of the electrical connecting mechanism 61 will press the shutter member 74 of the terminal mechanism 71 to turn the shutter member 74 in a direction opposite to the direction of arrow L in FIG. 10 in which the terminal opening 73 will be opened. Thus, the terminal block 79a of the terminal mechanism 71 of the camera body 11 will electrically be connected to the connecting portion 62a of the connector 62 that moves through the terminal opening 73 thus opened. At this time, the engagement pin 62b of the connector 62 is engaged in the engagement hole 79b formed on either side of the terminal block 79a to protect the electrical connection. Also, since the connector 62 moves through the terminal opening 73, the electrical connection will not be exposed to outside with the result that the electrical connection will be protected.

The video camera system 1 according to the present invention is designed for the camera body 11 to supply a high-voltage power of, for example, about 240 V to the adapter body 21. The camera body 11 starts supply of the power to the adapter body 21 after detecting when the grounds of the bodies 11 and 21 are connected to each other. So, even if the electrical connection is exposed, it is possible to prevent any foreign matter from touching the electrical connection. It should be noted that the power may be supplied from the adapter body 21 to the camera body 11.

In the above video camera system 1, the connecting portion 62a of the connector 62 is provided to face the insertion opening 23 with the electrical connecting mechanism 61 of the receptacle 22 of the adapter body 21 being protected by the cover member 63 and lid 64 as shown in FIG. 2, and the terminal block 79a of the terminal member 79 is provided inside the terminal opening 73 in the mount plate 72 of the rear bevel portion 15b of the on-shoulder carrying portion 16 of the camera body 11 to face the rear end of the camera body 11 as shown in FIG. 3. Therefore, with a series of steps of installing the camera body 11 in the receptacle 22 of the adapter body 21, the connecting portion 62a of the connector 62 at the adapter body 21 can electrically be connected to the terminal block 79a of the terminal member 79 at the camera body 11.

For electrical connection between the adapter body 21 and camera body 11, the lid 64 and cover member 63 of the electrical connecting mechanism 61 at the adapter body 21 are operated by the terminal mechanism 71 of the camera body 21 for the connecting portion 62a of the connector 62 to be exposed to outside, and the shutter member 74 of the terminal mechanism 71 at the camera body 11 is turned by the electrical connecting mechanism 61 at the adapter body 21 for the terminal block 79a of the terminal member 79 to be exposed to outside. With this series of operations, the connecting portion 62a of the connector 62 and terminal block 79a of the terminal member 79 are electrically connected to each other. Since the series of operations is effected during insertion of the camera body 11 into the receptacle 22 of the adapter body 21 from the insertion opening 23 and needs no additional operations for electrical connection, the video camera device 2 and adapter device 3 can be handled more easily for assembling.

Further, in the video camera system 1, since the terminal mechanism 71 of the camera body 11 and electrical connecting mechanism 61 provided in the receptacle 22 of the adapter body 21 are disposed opposite to each other, the front end of the adapter body 21 will finally be connected to the lens-unit mount 12 of the camera body 11 by means of the mechanical connecting mechanism 32 with their optical axes being aligned with each other while the camera body 11 is inserted into the receptacle 22 of the adapter body 21 from the insertion opening 23. Therefore, in this video camera system 1, the connecting portion 62a of the connector 62 of the camera body 11 and terminal block 79a of the terminal member 79 of the adapter body 21 can be protected with the adapter body 21 and camera body 11 being separated from each other. Also in the video camera system 1, the adapter body 21 and camera body 11 can be connected to each other electrically and mechanically while the camera body 11 is inserted into the receptacle 22 of the adapter body 21, which will lead to easier handling of the video camera device 2 and adapter device 3.

The camera body 11 will be installed to the adapter device 21, with the insertion opening 23 provided at the rear end of the adapter body 21 being opened by the lid 24. The mount base 26 on which the viewfinder 5 is to be mounted is provided on the lid 24 with the slider 27 being placed under the mount base 26. Therefore, the lid 24 having the viewfinder 5 mounted thereon will be very heavy. However, since the lid 24 is supported pivotably on the vertical pivot 25a of the hinge 25 of the adapter body 21, it can be prevented from being abruptly opened downward due to the weight of the viewfinder 5 when it is operated. Also, the grip 14 of the camera body 11 can be detached at the other end 14b thereof at the rear end from the camera body 11, turned about the one end 14a at the front end, and the other end 14b at the rear end can be put aside from before the slider 27. Therefore, the slider 27 having the viewfinder 5 mounted thereon can be slid toward the front end of the adapter body 21 so that the adapter device 3 having the video camera device 2 attached thereto can be made as short as possible. Thus, the video camera system 1 is easier to operate. Also, since the viewfinder 5 is mounted on the top of the lid 24, it can be put nearer to the optical axis of the lens-unit mount 12 of the camera body 11, which also contributes to improved operability of the video camera system 1.

It should be understood by those skilled in the art that various modifications, combinations, sub-combinations and alterations may occur depending on design requirements and other factors insofar as they are within the scope the appended claims or the equivalents thereof.

What is claimed is:

1. An adapter device to which a video camera device can be attached, the adapter device comprising:

An adapter body having a receptacle including a front receptacle surface, a rear receptacle surface, and a bottom receptacle surface, the front receptacle surface defining an imaging aperture, and the rear receptacle surface is located opposite to the front receptacle surface and is configured to open and close to allow insertion and withdrawal of the video camera device into and from the receptacle;

A mechanical connecting mechanism provided with the front receptacle surface, the mechanical connecting mechanism is configured to operatively lock and unlock a lens-unit mount on the video camera device to the front receptacle surface; and An electrical connecting mechanism provided with the bottom surface of the receptacle, the electrical connecting mechanism includes a connector, and the electrical connecting mechanism is configured to electrically connect the connector receptacle and with the video camera device by receiving a terminal block of the video camera device;

Wherein the electrical connecting mechanism further comprises:

A base attached to the bottom receptacle surface;

A connector attached to the base;

A hollow cover member operatively connected to the base in a first range of motion substantially parallel to the bottom receptacle surface, and the cover member includes a cover member opening adapted to allow the connector to enter and depart from the cover member during the first range of motion of the cover member.

2. The adapter device according to claim 1, wherein on the bottom of the receptacle, there is provided an insertion guiding means for guiding the video camera device being inserted into the receptacle.

3. The adapter device according to claim 1, wherein at the front end of the adapter body, a lens unit is installed to be aligned with the lens-unit mount of the video camera device.

4. The video camera device according to claim 1, wherein the front and bottom receptacle surfaces are substantially orthogonal to each other and the mechanical connecting mechanism is adjacent to the imaging aperture.

5. A video camera device including a video camera and an adapter device to which the video camera can be attached, wherein the adapter device includes:

An adapter body having formed therein a including a front receptacle surface, a rear receptacle surface, and a bottom receptacle surface, the front receptacle surface defining an imaging aperture, and the rear receptacle surface is located opposite to the front receptacle surface and is configured to open and close to allow insertion and withdrawal of the video camera into and from the receptacle having formed at the rear end thereof an opening through which the video camera device is to be inserted;

A mechanical connecting mechanism provided with the front receptacle surface, the mechanical connecting mechanism configured to operatively lock and unlock a lens-unit mount on the video camera to the front receptacle surface; and An electrical connecting mechanism provided with the bottom surface of the receptacle, the electrical connecting mechanism includes a connector, and the electrical connecting mechanism configured to electrically connect the connector with the video camera by receiving a terminal block of the video camera;

Wherein the electrical connecting mechanism further comprises:
- A base attached to the bottom receptacle surface;
- A connector attached to the base;
- A hollow cover member operatively connected to the base in a first range of motion substantially parallel to the bottom receptacle surface, and the cover member includes a cover member opening adapted to allow the connector to enter and depart from the cover member during the first range of motion of the cover member.

6. The adapter device according to claim 5, wherein the electrical connecting mechanism comprises:
a first forcing member attached to both the cover member and the base, the first forcing member adapted to provide force to the cover member in a direction away from the forward receptacle surface and consistent with producing a movement of the cover member to cover the adapter electrical contact when the adapter electrical assembly is not in physical contact with the video camera device.

7. The video camera device according to claim 5, wherein the front and bottom receptacle surfaces are substantially orthogonal to each other and the mechanical connecting mechanism is adjacent to the imaging aperture.

8. The video camera device according to claim 5, wherein the electrical connecting mechanism comprises:
a first forcing member attached to both the cover member and the base, the first forcing member adapted to provide force to the cover member in a direction away from the forward receptacle surface and consistent with producing a movement of the cover member to cover the adapter electrical contact when the adapter electrical assembly is not in physical contact with the video camera.

9. The video camera device according to claim 8 further comprising:
a camera terminal mechanism including:
  a terminal cavity formed within the video camera and adapted to have a terminal cavity opening; and
  a pivoting terminal member attached to the camera body by a first pivot, the first pivot having a second forcing member adapted to close the terminal cavity opening with the pivoting terminal member when the adapter device is not in physical contact with the pivoting terminal member,
  wherein the terminal block is configured to be attached to the video camera within the terminal cavity.

10. The video camera device according to claim 9, wherein the camera terminal mechanism includes a lock mechanism configured to prevent the pivoting terminal member from opening the terminal cavity opening when the lock mechanism is not in contact with the adapter device.

11. The video camera device according to claim 10, wherein the electrical connecting mechanism comprises:
a cover member lid operatively connected to the cover member via a third forcing member, the third forcing member is adapted to close the cover member opening with the cover member lid when the adapter device is not in physical contact with the video camera, the cover member lid configured to unlock the pivoting terminal member from the lock mechanism by interfacing with the lock mechanism and enabling the connector to interface with the terminal block.

12. The video camera device according to claim 11, wherein the lock mechanism comprises:
a closing plate attached to the video camera; and
a locking control member attached to the closing plate by an elastic member, the locking control member adapted to disengage from the pivoting terminal member upon a first interface event with the adapter device and thereby allow the adapter device to unlock the pivoting terminal member from the lock mechanism and thereby open the terminal cavity opening via a second interface event between the adapter device and the pivoting terminal member.

13. The video camera device according to claim 12, wherein the locking control member is adapted to disengage upon the first interface event with an unlocking tab attached to the cover member.

14. The video camera device according to claim 5, wherein the adapter device further comprises:
an engagement member configured to operatively connect to the lens-unit mount to the front receptacle surface and restrict the lens unit mount to a fixed position relative to the imaging aperture; and
a linkage adapted to operatively connect a control lever and the engagement member.

15. The video camera device according to claim 14, wherein the receptacle comprises:
a first side receptacle member substantially orthogonal to the front receptacle surface and connected to the bottom receptacle surface; and
a second side receptacle member substantially orthogonal to the front receptacle surface and connected to the bottom receptacle surface,
wherein the rear receptacle surface is configured to close the rear opening.

16. The video camera device according to claim 15, wherein the rear receptacle surface is operatively attached to the first side receptacle member via a hinge.

17. The video camera device according to claim 15, wherein the rear receptacle surface is operatively attached to the first side receptacle member, and the rear receptacle surface is adapted to operatively attach to and detach from the second side receptacle member.

18. The video camera device according to claim 15, wherein the rear receptacle surface is operatively attached to a viewfinder slider via a sliding interface, the viewfinder slider is adapted to operatively connect and disconnect from a viewfinder on the video camera, the sliding interface is adapted to allow the viewfinder slider to move in a second range of motion substantially parallel to the bottom receptacle surface.

19. The video camera device according to claim 14, wherein the imaging aperture is adapted to provide an interface between a lens unit and the lens-unit mount while said lens-unit mount is attached to the mechanical connecting mechanism.

20. The video camera device according to claim 14, wherein the adapter device includes an insertion guiding mechanism attached to the bottom receptacle surface and adapted to guide the video camera into the adapter device to thereby properly position the lens-unit mount on the video camera relative to the imaging aperture.

* * * * *